(12) United States Patent
Narayan et al.

(10) Patent No.: US 7,756,803 B2
(45) Date of Patent: Jul. 13, 2010

(54) METHOD OF PREDICTING AVAILABILITY OF A SYSTEM

(75) Inventors: Ranjani Narayan, Bangalore (IN); Keshavan Varadarajan, Bangalore (IN); Gautham Natanasabapathy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

(21) Appl. No.: 11/885,475

(22) PCT Filed: Mar. 3, 2005

(86) PCT No.: PCT/IN2005/000069

§ 371 (c)(1),
(2), (4) Date: Aug. 31, 2007

(87) PCT Pub. No.: WO2006/092806

PCT Pub. Date: Sep. 8, 2006

(65) Prior Publication Data

US 2008/0168314 A1    Jul. 10, 2008

(51) Int. Cl.
G06F 17/00    (2006.01)
G06F 5/00    (2006.01)
(52) U.S. Cl. ........................................................ 706/45
(58) Field of Classification Search .................... 706/45
See application file for complete search history.

(56) References Cited

U.S. PATENT DOCUMENTS 7,437,524 B2 *   10/2008   Narayan et al. ............. 711/161
2004/0225649 A1  11/2004   Yeo et al.

* cited by examiner

*Primary Examiner*—Michael Holmes

(57) ABSTRACT

The computer availability is predicted by determining a hazard fail rate for the computer system that is based on the hazard fail rate of the individual computer components and the computer system structure s6, as well as the mean repair rate for the system. The computer hazard rates of individual computer system components are based on the error monitoring of those computer components during the computer system operation in real time.

16 Claims, 4 Drawing Sheets

METHOD OF PREDICTING AVAILABILITY OF A SYSTEM

FIELD OF THE INVENTION

The present invention relates to the prediction of availability of a system.

BACKGROUND

As systems age, the components within them are increasingly prone to faults. Faults can occur both in the hardware domain and the software domain. Examples of this in the hardware domain are failure of memory, disks, processor cache and so on. In the software domain, which includes system software such as operating systems and application or middleware software, software performance can decrease because of the impact of new hardware on the existing software. In addition, the probability of a software error in a less used path increases with time. Failures such as memory leaks also become more evident over time.

A reactive approach is the conventional approach to the above problem, in which corrective action is only taken after faults have occurred.

However, some faults can be corrected when the system is on-line. Examples of these are processor cache replacement (current day processors are manufactured with extra cache lines as a contingency to replace faulty cache lines), process restarts or migration to another processor due to a decrease in processing power. The objective of performing fault correction is to keep systems and ultimately business processes running, without human interaction. However, these corrections come with an overhead and have an adverse impact on system performance. The greater the number of faults, the greater the impact on applications and the services and processes they support, for example business processes, in terms of Quality of Service (QoS).

A proactive approach to fault correction in a system, in which fault prediction leads to proactive corrective action in advance of an actual fault developing, has significant advantages over the reactive approach, leading, for example, to maintenance of quality of service above a desired level. However, to implement this approach, there needs to be some way of determining when the quality of service provided by the overall system is likely to fall below the desired or agreed service levels.

Traditional methods of fault tolerance use duplication of resources to a very large extent to drastically reduce the non-availability of the system. For example, if the probability of availability of a machine is 0.96, deploying two machines of the same kind reduces the probability of non-availability from 0.04 to 0.0016. Such methods of fault tolerance do not scale well in large environments, since duplication of all resources is practically not possible. Furthermore, the availability specifications provided by the manufacturer are production time metrics, often based on an average, and are not indicative of the failure of a specific component in a specific operational environment.

SUMMARY OF THE INVENTION

The present invention aims to provide a method of predicting system availability.

According to the invention, there is provided a method of predicting availability of a system, the system comprising a plurality of components, the method comprising determining a hazard rate for the system, determining a mean repair rate for the system and calculating the system availability from the system hazard rate and the system mean repair rate.

The prediction of system availability can be performed while the system is in operation, to form the basis of keeping a system running to provide a specified service quality. The various components making up the system are continuously monitored, their reliability computed and their availability therefore predicted by closely examining the patterns of occurrence of faults. The instantaneous availability of the system is therefore continuously reevaluated as errors occur in the system.

The step of determining a hazard rate for the system can comprise determining a system structure, the structure comprising interconnections between the components, determining a hazard rate for each of the components and determining the system hazard rate from the component hazard rates.

The step of determining the system hazard rate from the component hazard rates can comprise combining the hazard rates for each of the components based on the determined structure.

The combination may be done in an analogous way to calculating an equivalent impedance for an impedance network structure that comprises interconnections between impedances.

The step of determining a hazard rate for each of the components may include monitoring each of the components during operation of the system to determine an error history. By performing monitoring while the system is live, true error rates and therefore availability can be determined, as opposed to the average non-live availability figures provided by manufacturers.

The error history may comprise the number of errors occurring over a predetermined time period.

The method may further comprise comparing the error history with an error threshold and determining the hazard rate as the probability of crossing the error threshold given the error history.

The step of determining a mean repair rate for the system may comprise determining a mean repair rate for each of the components, calculating individual availabilities of each of the components based on the mean repair rate, calculating a steady state system availability based on the individual availabilities and calculating the mean repair rate for the system from the steady state system availability.

The step of calculating a steady state system availability may comprise calculating a weighted function, in which the weights for each individual component represent an importance of the component relative to other components.

System availability can be used as a measure to take appropriate action, for example, correction based on prediction, so that overheads due to faults are kept to a minimum. Examples of these are a system administrator replacing potentially faulty hardware, for example, a processor for which the availability prediction indicates failure in the near future, when the system is running (on-line replacement) and migration of processes to other hardware when predicted availability indicates a degradation in process performance, as opposed to process migration after observing performance degradation.

According to the invention, there is further provided apparatus for maintaining a system at a predetermined service level, comprising means for monitoring the system for errors, means for predicting availability of the system based on the errors and means for acting in response to the predicted availability to maintain the system at the predetermined service level.

DETAILED DESCRIPTION

Figure 1:
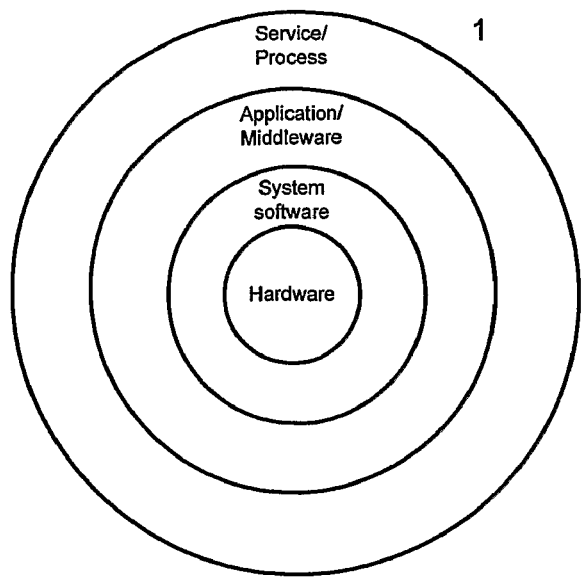
FIG. 1 is a schematic illustration of a generic system including a number of layers from hardware to service/process.

FIG. 1 illustrates a generic system that includes a number of layers. Each layer is a component that contributes functionality to the overall system. Furthermore, each layer itself comprises a large number of other components connected together in a predetermined way, with the ultimate purpose of implementing a service or process, for example a technical or business process.

Each component contributes to the execution of the service and each has its own failure characteristic. These failures affect the service in various ways depending upon the kind of failure. Of course, the availability of components in the lower layers, particularly the hardware layer, has the potential to influence availability of components in the upper layers.

The availability of the system at any time, also referred to as the instantaneous availability, gives an indication of the ability of the system to satisfy service requirements, for example Quality of Service requirements placed on a business process. The instantaneous availability of the system at any time 't' is given by the following equation:

$$\overline{A}(t) = \frac{\overline{\mu}}{\overline{\lambda}+\overline{\mu}} + \frac{\overline{\lambda}}{\overline{\lambda}+\overline{\mu}} e^{-(\overline{\lambda}+\overline{\mu})t}$$

where $\overline{A}(t)$ is the instantaneous availability of the system;

$\overline{\lambda}$ is the system hazard rate; and $\overline{\mu}$ is the mean repair rate of the system.

Equation 1 Instantaneous Availability of the System

The hazard rate $\overline{\lambda}$ of a system is the instantaneous probability of the failure of the system. The mean repair rate of the system $\overline{\mu}$ is the rate at which system can be repaired. It is the inverse of the mean time to repair (MTTR) of the system.

Figure 2:
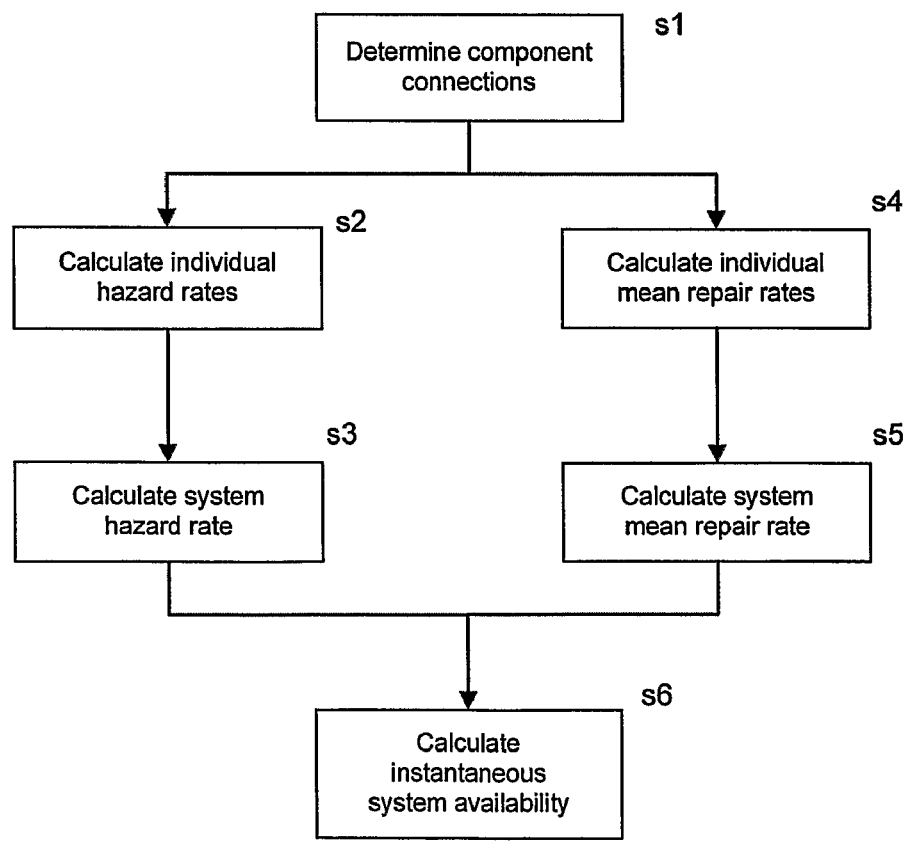
FIG. 2 is a flow diagram illustrating the overall determination of system availability according to the invention.

The way in which the system availability can be determined is illustrated schematically in FIG. 2. The internal organisation of the system first needs to be determined to determine how the various individual components are connected to one another (step s1). Hazard rates for the individual components can then be calculated, as will be described in detail below (step s2). The individual component hazard rates are then combined to produce the system hazard rate (step s3). Mean repair rates for each of the individual components are then calculated, also as described in detail below (step s4). The system mean repair rate is calculated from the individual component mean repair rates (step s5). Finally, the system availability is computed using Equation 1 set out above.

Each component of the system has its own hazard rate $\lambda$, which is the instantaneous probability of the failure of that component. A complex system can be represented as a number of components that are connected in series and/or parallel. The system hazard rate of the entire system can then be calculated by combining the individual hazard rates in an analogous way to the computation of the impedance of an electrical circuit composed of several impedances connected in series and/or parallel.

Figure 3:
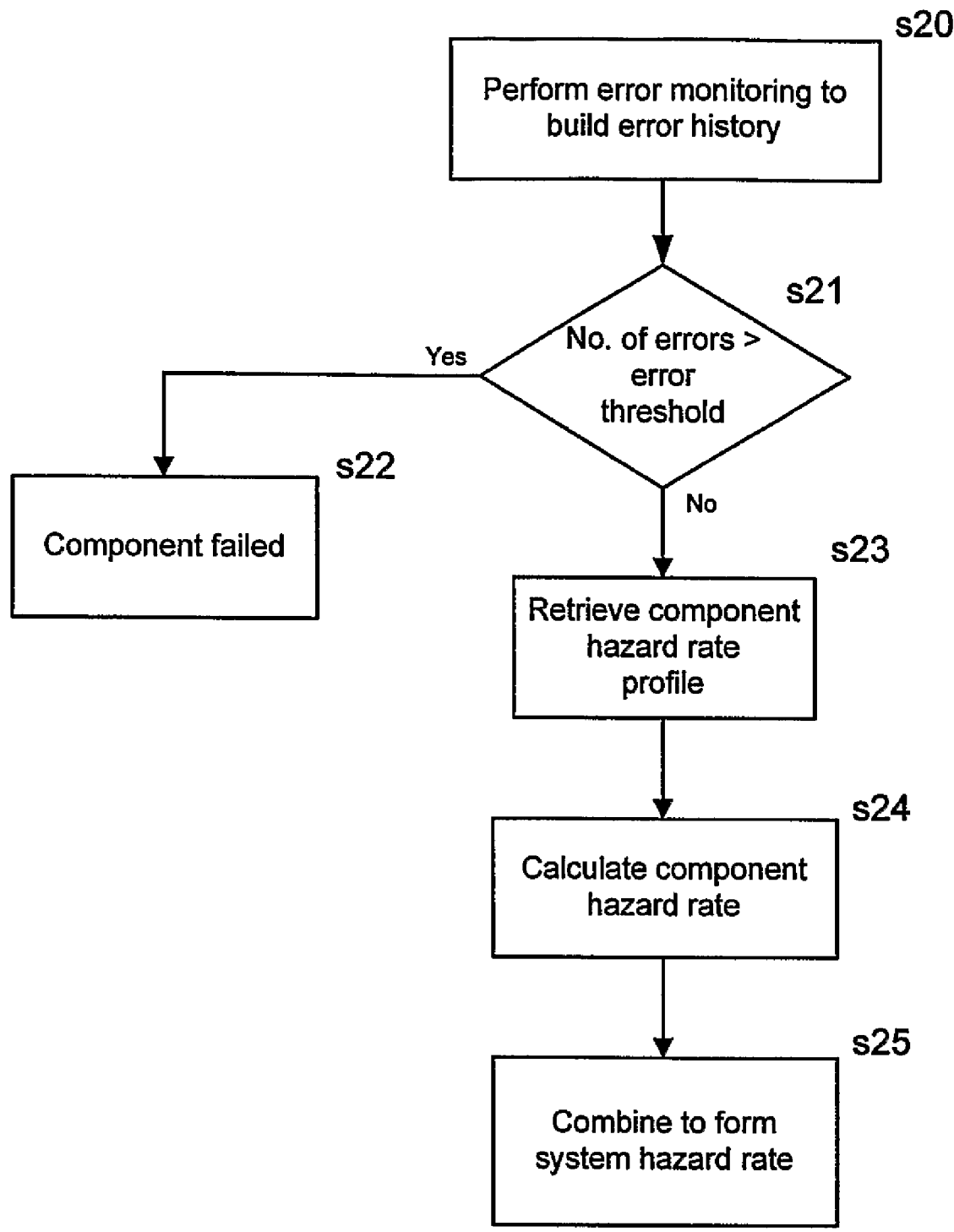
FIG. 3 is a flow diagram illustrating the calculation of component hazard rates according to the invention.

The process of determining a hazard rate will now be described with reference to FIG. 3. To obtain a hazard rate for each of the individual components, error monitoring is performed while the system is operational to determine an error history (step s20). The hazard rate is a function of the error history, error threshold and the quality of the component. The error threshold defines the maximum number of errors allowed, after which the component is considered as failed. The error history defines the error behaviour of the component up to the present time. The error history is therefore compared with the error threshold to determine whether the number of occurred errors exceeds the error threshold (step s21). If it does, the component is determined to have failed (step s22). If not, the hazard rate for the component can be computed. The quality of the component is determined by the quality at release time, and may be the quality of the batch in the case of manufactured items.

The hazard rate is computed as a probability of the component exceeding the error threshold, given the error history. For example, if the error threshold for a processor is set to be 3 errors in 24 hours and the current error history indicates that 2 errors have occurred in 12 hours, then the hazard rate is the probability of occurrence of the third error in the next 12 hours, since this will cause the error threshold to be crossed.

The hazard rates are assumed to follow standard probability density functions, such as Gaussian, Poisson, exponential and so on, based on the characteristics of the component, the probability density function indicating the relative probability of failure at different times. The probability of an error occurring in the next 12 hours is governed by the variance of the distribution.

Referring again to FIG. 3, the component hazard rate profile (probability density function) can then be retrieved (step s23) and the component hazard rate calculated as set out above (step s24).

Figure 4:
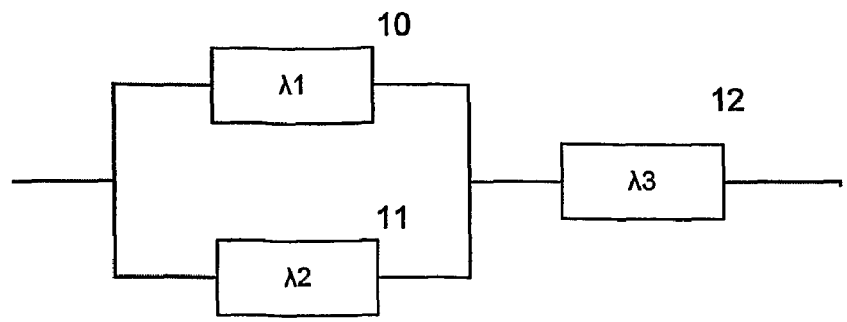
FIG. 4 is a schematic diagram illustrating the principles of combining individual component hazard rates to determine a system hazard rate.

The hazard rate of the entire system can then be calculated (step s25) by combining the individual hazard rates, by analogy with the well known method of calculating equivalent impedance in a complex electrical circuit, as mentioned above. For example, FIG. 4 illustrates a system configuration in which first and second components 10, 11 are connected in parallel and the combination is in series with a third component 12. Each component is associated with its own individual hazard rate $\lambda_1$, $\lambda_2$ and $\lambda_3$ respectively. The system hazard rate is then:

$$\overline{\lambda} = \left(\frac{\lambda_1 \lambda_2}{\lambda_1 + \lambda_2}\right) + \lambda_3.$$

Equation 2 System Hazard Rate

Component and system reliabilities can also be calculated given the above component and system hazard rates.

Once the hazard rates of individual components are known, their individual reliability can be calculated using the equation:

$$R = e^{-\lambda t}$$

where

R is the component reliability;
λ is the component hazard rate; and
t is the time after the first error for which reliability is being assessed.

Equation 3 Component Reliability

The system hazard rate can be used to calculate the system reliability using the following equation:

$$\overline{R} = e^{-\overline{\lambda} t}$$

where $\overline{R}$ is the system reliability;
$\overline{\lambda}$ is the system hazard rate; and
t is the time after the first error for which reliability is being assessed.

Equation 4 System Reliability

Just as every component has its own hazard rate, it also has its own mean repair rate μ. The mean repair rate is the rate at which an error in a component can be corrected. The mean repair rate, in the absence of redundant components, is the inverse of the amount of time taken to redo an operation on account of a failure in the component. Where there is a redundant component, and assuming that the state prior to failure can be transferred from one component to another, then the mean repair rate is the inverse of the time taken to activate the redundant component. For example, if the activation time for a redundant component is 1 ms, the mean repair rate is 1000 s$^{-1}$.

By way of further example, in the case of a memory page de-allocation, the penalty would be to reload the affected page from disk into memory. The mean repair rate is then the inverse of the average memory page load latency. Similarly, when a processor is lost and if the process state is not saved, then the worst-case repair rate will be the inverse of the time taken to restart the application with the largest load time. However, an average value may also be assumed if a pessimistic availability is not desired. For more optimistic values, the average time to repair can also be used.

The mean repair rate calculation shown as step s4 in FIG. 2 is therefore an individual calculation that will be different for each component.

Figure 5:
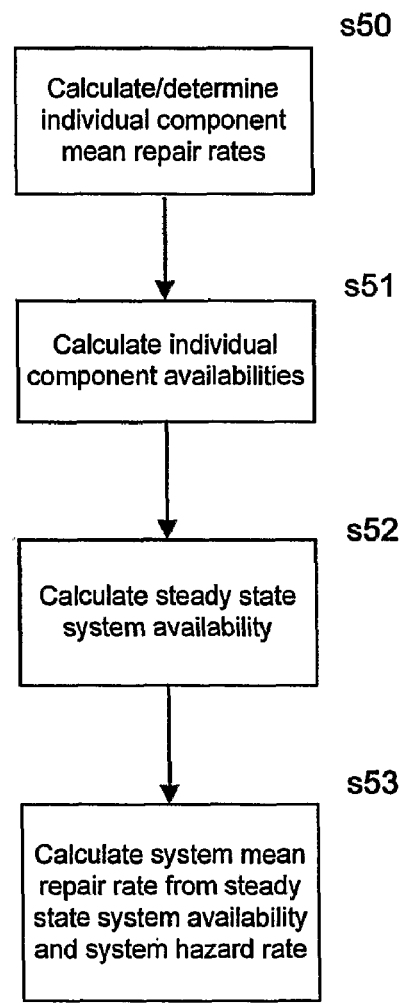
FIG. 5 is a flow diagram illustrating the calculation of system mean repair rate.

A method of obtaining the mean repair rate $\overline{\mu}$ of the entire system will now be described with reference to FIG. 5.

First, the individual mean repair rates μ are calculated as described above (step s50). The individual availabilities (at steady state) of each of the components are then computed (step s51) using the following equation:

$$A = \frac{\mu}{\lambda + \mu}$$

where

A is the steady state availability of an individual component;
μ is the mean repair rate of the component; and
λ is the hazard rate of the individual component.

Equation 5 Steady State Availability of a Component

The availability of the entire system $\overline{A}$ is then computed using a weighted function of the availabilities of all the components (step s52), in accordance with the following equation:

$$\overline{A} = f(w_i, A_i)$$

where $\overline{A}$ is the steady state availability of the entire system;
$A_i$ is a steady state availability of a selected component i; and
$w_i$ is an individual weighting factor for the selected component i.

Equation 6 Steady State Availability of the Entire System

Weighting factors are used in order to capture system peculiarities that differentiate the most critical component from the less critical components. For example, the motherboard of a computer system may be the most critical component, since it must necessarily be available for the system to be available, whereas a floppy disk drive is far less critical and only need affect the availability of the system in a marginal way.

The mean repair rate of the system is then computed (step s53) from the formula:

$$\overline{A} = \frac{\overline{\mu}}{\overline{\lambda} + \overline{\mu}}$$

$$\Rightarrow \overline{\mu} = \frac{\overline{A}\overline{\lambda}}{1 - \overline{A}}$$

where $\overline{A}$ is the steady state availability of the entire system;
$\overline{\mu}$ is the mean repair rate for the entire system; and
$\overline{\lambda}$ is the hazard rate for the entire system.

Equation 7 Mean Repair Rate of the Entire System

We have calculated the system hazard rate from Equation 2 above and the steady state availability of the system from Equation 6 above. Therefore, given these values, the mean repair rate of the system can be computed using Equation 7.

Finally, the instantaneous availability of the system $\overline{A}(t)$ can then be calculated from Equation 1 above, as shown in FIG. 2, step s6.

It will be appreciated that the methods and equations set out above can be used on any kind of system once the various components of the system, its internal organization and the relationship among components, and the hazard and repair rates of the components are known. The method is applicable irrespective of the type of component, for example, whether these comprise hardware, software, firmware or middleware.

Figure 6:
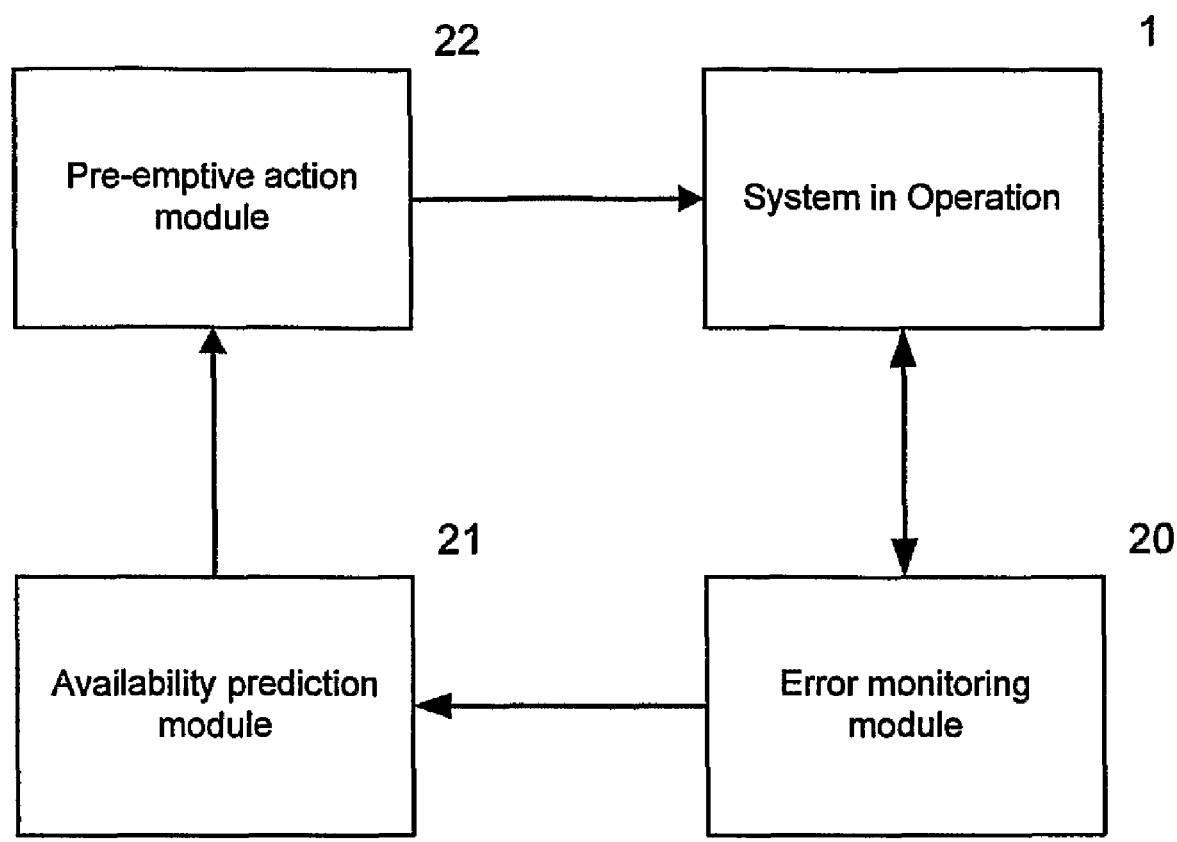
FIG. 6 illustrates an apparatus for taking pre-emptive action to maintain a system at a predetermined service level based on a continuous re-evaluation of system availability resulting from error monitoring of the system.

FIG. 6 illustrates a combination of modules used to monitor an operational system 1 and attempt to prevent the system degrading beyond a predetermined quality of service level, and ultimately failing. An error monitoring module 20 carries out error monitoring on the live system 1. As errors are detected the availability of the system is re-evaluated by an availability prediction module 21 based on the equations and methods set out above. Finally, the availability prediction is used by a pre-emptive action module 22 to make any necessary changes to the system 1, for example, automatically bypassing a potentially faulty component or enabling other maintenance and repair services to run. The pre-emptive action module may alternatively flag required actions to an operator.

The invention claimed is:

1. A method of predicting availability of a system, the system comprising a plurality of components, the method comprising:
   determining a hazard rate for the system;
   determining a mean repair rate for the system; and
   calculating the system availability from the system hazard rate and the system mean repair rate.

2. A method according to claim 1, wherein the step of determining a hazard rate for the system comprises:
   determining a system structure, the structure comprising interconnections between the components;
   determining a hazard rate for each of the components; and
   determining the system hazard rate from the component hazard rates.

3. A method according to claim 2, wherein the step of determining the system hazard rate from the component hazard rates comprises:
   combining the component hazard rates for each of the components based on the determined structure.

4. A method according to claim 3, wherein the step of determining a reliability for each of the components from the component hazard rate comprises using the equation:

$$R = e^{-\lambda t}$$

where
   R is the component reliability;
   $\lambda$ is the component hazard rate; and
   t is the time after the first error for which reliability is being assessed.

5. A method according to claim 2, wherein the step of determining a hazard rate for each of the components includes monitoring each of the components during operation of the system to determine an error history.

6. A method according to claim 5, wherein the error history comprises the number of errors occurring over a predetermined time period.

7. A method according to claim 5, further comprising:
   comparing the error history with an error threshold; and
   determining the hazard rate as the probability of crossing the error threshold given the error history.

8. A method according to claim 1, wherein the step of determining a mean repair rate for the system comprises:
   determining a mean repair rate for each of the components;
   calculating individual availabilities of each of the components based on the mean repair rate;
   calculating a steady state system availability based on the individual availabilities; and
   calculating the mean repair rate for the system from the steady state system availability.

9. A method according to claim 8, wherein the step of calculating a steady state system availability comprises calculating a weighted function, in which the weights for each individual component represent an importance of the component relative to other components.

10. A method according to claim 8, comprising calculating an individual availability for a component in accordance with the equation:

$$A = \frac{\mu}{\lambda + \mu}$$

where
   A is the availability of an individual component;
   $\mu$ is the mean repair rate of the component; and
   $\lambda$ is the hazard rate of the component.

11. A method according to claim 8, comprising calculating the mean repair rate of the system in accordance with the equation:

$$\overline{\mu} = \frac{\overline{A}\overline{\lambda}}{1 - \overline{A}}$$

where
   $\overline{A}$ is the steady state availability of the system;
   $\overline{\mu}$ is the mean repair rate for the system; and
   $\overline{\lambda}$ is the hazard rate for the system.

12. A method according to claim 1, comprising calculating the system availability in accordance with the equation:

$$\overline{A}(t) = \frac{\overline{\mu}}{\overline{\lambda} + \overline{\mu}} + \frac{\overline{\lambda}}{\overline{\lambda} + \overline{\mu}} e^{-(\overline{\lambda} + \overline{\mu})t}$$

where
   $\overline{A}(t)$ is the instantaneous availability of the system;
   $\overline{\lambda}$ is the system hazard rate; and
   $\overline{\mu}$ is the mean repair rate of the system.

13. A method of maintaining a system at a predetermined service level, comprising:
   predicting system availability according to claim 1; and
   acting to maintain the predetermined service level in response to the predicted availability.

14. A method according to claim 13, wherein the step of acting to maintain the predetermined service level comprises replacing a component while the system is operational, the component being a component that is predicted to fail.

15. A method according to claim 13, wherein the step of acting to maintain the predetermined service level comprises enabling migration of a process to other hardware, when predicted availability indicates a degradation in process performance.

16. Apparatus for maintaining a system at a predetermined service level, comprising:
   means for monitoring the system for errors;
   means for predicting availability of the system based on the errors; and
   means for acting in response to the predicted availability to maintain the system at the predetermined service level.

* * * * *